US012634548B2

(12) United States Patent
Li et al.

(10) Patent No.: US 12,634,548 B2
(45) Date of Patent: May 19, 2026

(54) VIDEO PROCESSING METHOD AND APPARATUS, DEVICE, AND STORAGE MEDIUM

(71) Applicant: Beijing Zitiao Network Technology Co., Ltd., Beijing (CN)

(72) Inventors: Zeyu Li, Beijing (CN); Wen Zhao, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/683,150

(22) PCT Filed: Aug. 5, 2022

(86) PCT No.: PCT/CN2022/110513
§ 371 (c)(1),
(2) Date: Feb. 12, 2024

(87) PCT Pub. No.: WO2023/016363
PCT Pub. Date: Feb. 16, 2023

(65) Prior Publication Data
US 2024/0357195 A1      Oct. 24, 2024

(30) Foreign Application Priority Data
Aug. 12, 2021    (CN) ......................... 202110925453.5

(51) Int. Cl.
*H04N 21/431* (2011.01)
*H04N 21/4788* (2011.01)

(52) U.S. Cl.
CPC ..... *H04N 21/4316* (2013.01); *H04N 21/4788* (2013.01)

(58) Field of Classification Search
None
See application file for complete search history.

(56) References Cited

U.S. PATENT DOCUMENTS 6,061,056 A * 5/2000 Menard .............. H04N 21/4826
715/704
6,184,877 B1 * 2/2001 Dodson .................. H04N 21/47
348/E7.071
(Continued)

FOREIGN PATENT DOCUMENTS

CN 103034722 A 4/2013
CN 103826164 A 5/2014
(Continued)

OTHER PUBLICATIONS

International Search Report and Written Opinion for International Application No. PCT/CN2022/110513, mailed Sep. 29, 2022, 16 pages.

(Continued)

*Primary Examiner* — An Son P Huynh

(57) ABSTRACT

A video processing method, apparatus, device and storage device is provided. The method comprises: displaying, on a play page of a target video, a hot topic panel entrance; and in response to receiving a trigger operation for the hot topic panel entrance, displaying a hot topic panel on the play page of the target video, wherein the hot topic panel displays hot topic contents for a first set of videos to which the target video belongs.

15 Claims, 3 Drawing Sheets

(56) References Cited

U.S. PATENT DOCUMENTS

| | | | | |
|---|---|---|---|---|
| 6,239,794 | B1* | 5/2001 | Yuen | H04N 7/0887 |
| | | | | 348/565 |
| 7,143,428 | B1* | 11/2006 | Bruck | H04N 21/6175 |
| | | | | 709/204 |
| 7,673,315 | B1* | 3/2010 | Wong | H04N 21/43622 |
| | | | | 386/254 |
| 8,610,673 | B2* | 12/2013 | Storrusten | G06F 3/0482 |
| | | | | 345/173 |
| 8,849,945 | B1* | 9/2014 | Desjardins | G11B 27/34 |
| | | | | 725/35 |
| 9,693,019 | B1* | 6/2017 | Fluhr | H04L 65/1069 |
| 9,762,971 | B1* | 9/2017 | Dodge | H04N 21/4532 |
| 9,788,072 | B2* | 10/2017 | Chung | G06F 3/04842 |
| 10,652,618 | B2* | 5/2020 | Sarkar | H04N 21/2187 |
| 10,880,609 | B2* | 12/2020 | Chipman | H04N 21/4826 |
| 10,911,832 | B2* | 2/2021 | Paglia | H04N 21/26258 |
| 11,082,467 | B1* | 8/2021 | Hartnett | H04L 65/403 |
| 11,463,533 | B1* | 10/2022 | Garber | H04L 51/02 |
| 11,832,024 | B2* | 11/2023 | Hays | H04N 7/17318 |
| 11,909,921 | B1* | 2/2024 | Paul | H04M 3/567 |
| 12,063,423 | B1* | 8/2024 | Neuweg | H04N 21/8541 |
| 12,200,320 | B2* | 1/2025 | Yoshida | H04N 21/2402 |
| 2005/0262542 | A1* | 11/2005 | DeWeese | H04N 21/454 |
| | | | | 348/E7.071 |
| 2006/0149709 | A1 | 7/2006 | Krakirian et al. | |
| 2009/0133070 | A1* | 5/2009 | Hamano | H04N 21/64322 |
| | | | | 725/46 |
| 2009/0187859 | A1* | 7/2009 | Tuerk | G06F 16/40 |
| | | | | 715/764 |
| 2010/0017474 | A1* | 1/2010 | Kandekar | H04N 21/4312 |
| | | | | 709/205 |
| 2010/0153885 | A1* | 6/2010 | Yates | G06F 16/7867 |
| | | | | 707/723 |
| 2011/0249074 | A1* | 10/2011 | Cranfill | H04N 23/90 |
| | | | | 348/E7.083 |
| 2011/0279311 | A1* | 11/2011 | Hamano | G06F 16/9535 |
| | | | | 707/769 |
| 2011/0320380 | A1* | 12/2011 | Zahn | H04N 21/4668 |
| | | | | 705/347 |
| 2012/0137316 | A1* | 5/2012 | Elizarov | H04N 21/24 |
| | | | | 725/9 |
| 2013/0018916 | A1* | 1/2013 | Busch | G06F 16/319 |
| | | | | 707/742 |
| 2013/0275411 | A1* | 10/2013 | Kim | G06F 16/532 |
| | | | | 707/722 |
| 2013/0294755 | A1* | 11/2013 | Arme | G11B 27/28 |
| | | | | 386/E5.041 |
| 2014/0026051 | A1* | 1/2014 | Roh | G06F 16/743 |
| | | | | 715/720 |
| 2014/0068692 | A1* | 3/2014 | Archibong | H04N 21/4334 |
| | | | | 725/116 |
| 2014/0081954 | A1* | 3/2014 | Elizarov | G06F 16/9536 |
| | | | | 707/722 |
| 2014/0344861 | A1* | 11/2014 | Berner | H04N 21/41407 |
| | | | | 725/46 |
| 2015/0016801 | A1* | 1/2015 | Homma | G11B 27/19 |
| | | | | 386/243 |
| 2015/0110470 | A1 | 4/2015 | Zhang et al. | |
| 2015/0153910 | A1* | 6/2015 | Wheeler | G06F 3/0485 |
| | | | | 715/837 |
| 2015/0182861 | A1* | 7/2015 | Winter | G06Q 50/01 |
| | | | | 463/31 |
| 2015/0350729 | A1* | 12/2015 | Reynolds | H04N 21/4325 |
| | | | | 725/34 |
| 2016/0142779 | A1* | 5/2016 | Rasanen | H04N 21/4782 |
| | | | | 725/45 |
| 2016/0189042 | A1* | 6/2016 | Gill | G06F 16/9535 |
| | | | | 706/11 |
| 2016/0232241 | A1* | 8/2016 | Stoyanov | G06F 16/9535 |
| 2017/0006322 | A1* | 1/2017 | Dury | H04N 21/254 |
| 2017/0064374 | A1* | 3/2017 | Eim | G06F 3/0485 |
| 2017/0083628 | A1* | 3/2017 | Frenkel | H04L 51/52 |
| 2017/0264585 | A1 | 9/2017 | Xu et al. | |
| 2018/0025078 | A1* | 1/2018 | Quennesson | H04N 21/4788 |
| | | | | 725/141 |
| 2018/0027298 | A1* | 1/2018 | Paglia | H04N 21/234 |
| | | | | 725/37 |
| 2018/0048599 | A1 | 2/2018 | Arghandiwal et al. | |
| 2018/0077092 | A1* | 3/2018 | Jalil | G06Q 10/101 |
| 2018/0091468 | A1* | 3/2018 | Yong | H04L 51/216 |
| 2018/0199110 | A1* | 7/2018 | Cormican | H04N 21/4722 |
| 2018/0234738 | A1* | 8/2018 | Sarkar | H04N 21/2541 |
| 2018/0288490 | A1* | 10/2018 | Thomas | H04N 21/8133 |
| 2018/0322098 | A1 | 11/2018 | Tian | |
| 2019/0132650 | A1* | 5/2019 | Kedenburg, III | H04N 21/4223 |
| 2019/0289359 | A1* | 9/2019 | Sekar | H04N 21/4333 |
| 2019/0325079 | A1* | 10/2019 | Blake | G06F 16/3334 |
| 2019/0342507 | A1* | 11/2019 | Dye | G06T 13/40 |
| 2019/0349619 | A1* | 11/2019 | Hou | G06N 3/08 |
| 2020/0260137 | A1* | 8/2020 | Chen | H04N 21/47217 |
| 2020/0356593 | A1* | 11/2020 | Azzinnari | G06F 16/64 |
| 2020/0382681 | A1* | 12/2020 | Smithwick | H04N 9/3194 |
| 2020/0382845 | A1* | 12/2020 | Payne | H04N 21/4882 |
| 2020/0396497 | A1* | 12/2020 | Liu | H04N 21/4826 |
| 2021/0006867 | A1* | 1/2021 | Liu | H04N 21/4316 |
| 2021/0035559 | A1* | 2/2021 | Xu | G10L 15/063 |
| 2021/0105538 | A1* | 4/2021 | Ogawa | H04N 21/8456 |
| 2021/0150222 | A1* | 5/2021 | Evans | H04N 21/251 |
| 2021/0185386 | A1* | 6/2021 | Kong | H04N 21/4394 |
| 2021/0258643 | A1* | 8/2021 | Park | H04N 21/4756 |
| 2021/0266641 | A1* | 8/2021 | Selfors | H04N 21/4856 |
| 2022/0006661 | A1* | 1/2022 | Rathod | H04L 12/1818 |
| 2022/0021950 | A1* | 1/2022 | Wei | H04N 21/44016 |
| 2022/0239988 | A1* | 7/2022 | Yang | H04N 21/4725 |
| 2022/0360841 | A1 | 11/2022 | Tian et al. | |
| 2023/0039774 | A1* | 2/2023 | Luo | G06F 3/0481 |
| 2023/0276102 | A1* | 8/2023 | Chen | G06T 7/70 |
| | | | | 725/34 |
| 2023/0318997 | A1* | 10/2023 | Rathod | H04N 21/254 |
| | | | | 709/203 |
| 2023/0326115 | A1* | 10/2023 | Xiao | H04N 21/431 |
| | | | | 345/473 |
| 2025/0209119 | A1* | 6/2025 | Blake | G06F 16/907 |

FOREIGN PATENT DOCUMENTS

| | | |
|---|---|---|
| CN | 109754298 A | 5/2019 |
| CN | 110475134 A | 11/2019 |
| CN | 111246275 A | 6/2020 |
| CN | 111641859 A | 9/2020 |
| CN | 111770384 A | 10/2020 |
| CN | 112511889 A | 3/2021 |
| CN | 111246275 B | 4/2021 |
| CN | 112954440 A | 6/2021 |
| CN | 112989076 A | 6/2021 |
| CN | 113065081 A | 7/2021 |
| CN | 113645496 A | 11/2021 |
| JP | 2018-142989 A | 9/2018 |
| JP | 2021-027583 A | 2/2021 |
| JP | 2021-057686 A | 4/2021 |
| WO | 2021052255 A1 | 3/2021 |
| WO | 2021052256 A1 | 3/2021 |
| WO | 2021147414 A1 | 7/2021 |

OTHER PUBLICATIONS

Extended European Search Report for European Application No. 22855344.2, mailed Oct. 8, 2024, 8 pages.

Communication Pursuant to Rules 70(2) and 70a(2) EPC for European Application No. 22855344.2, mailed Oct. 25, 2024, 1 page.

Office action received from Japanese patent application No. 2024-506612 mailed on Mar. 4, 2025, 10 pages.

* cited by examiner

Displaying, on a play page of a target video, a hot topic panel entrance ⟋ S101

In response to a trigger operation for the hot topic panel entrance, displaying a hot topic panel on the play page of the target video ⟋ S102

VIDEO PROCESSING METHOD AND APPARATUS, DEVICE, AND STORAGE MEDIUM

CROSS-REFERENCE OF RELATED APPLICATION(S)

The present application is a U.S. National Phase Application under 37 C.F.R. § 371 of International Patent Application No. PCT/CN2022/110513, filed Aug. 5, 2022, which claims priority to Chinese Patent Application No. 202110925453.5, filed Aug. 12, 2021, the disclosures of which are incorporated herein by reference in their entireties.

FIELD

The present disclosure relates to the field of data processing, and more specifically, to a video processing method, apparatus, device and storage medium.

BACKGROUND

With the constant development of Internet short video technology, people have an increasing need for diversified video processing. The current technical problem to be solved is how to provide diversified video processing approaches to meet needs of users.

SUMMARY

To fully or at least partly address the above technical problem, the present disclosure provides a video processing method that can provide more approaches for video processing and meet the diversified needs of the users for video processing.

In a first aspect, the present disclosure provides a video processing method, comprising:

displaying, on a play page of a target video, a hot topic panel entrance; wherein the target video belongs to a first collection of videos;

in response to a trigger operation for the hot topic panel entrance, displaying a hot topic panel on a play page of the target video, wherein a hot topic content for the first collection of videos is displayed on the hot topic panel.

In an optional implementation, the method further comprises:

displaying, within a display area corresponding to the hot topic panel entrance, a hot topic comment for the first collection of videos.

In an optional implementation, the displaying, within a display area corresponding to the hot topic panel entrance, a hot topic comment for the first collection of videos includes:

displaying, within a display area corresponding to the hot topic panel entrance, a plurality of hot topic comments for the first collection of videos in a manner of rolling carousel.

In an optional implementation, the method further comprises:

in response to a trigger operation of switching from the first collection of videos to a second collection of videos, switching a hot topic comment displayed within a display area corresponding to the hot topic panel entrance to a hot topic comment for the second collection of videos.

In an optional implementation, the method further comprises:

upon receiving a trigger operation of switching from the first collection of videos to a second collection of videos, hiding the hot topic panel entrance downward in response to the first collection of videos is switched out, and floating the hot topic panel entrance upward in response to the second collection of videos is switched in: and a hot topic comment for the second collection of videos is displayed within a display area corresponding to the hot topic panel entrance.

In an optional implementation, the hot topic panel is provided with a comment entrance, and the method further comprises:

receiving a comment content posted by a current user against the first collection of videos based on the comment entrance: and displaying the comment content at top of the hot topic panel.

In an optional implementation, the hot topic panel entrance is a partial area of the hot topic panel and the in response to a trigger operation for the hot topic panel entrance, displaying a hot topic panel on a play page of the target video comprises:

in response to a drag and swipe-up operation on the hot topic panel entrance, pulling the hot topic panel from bottom for display on the play page of the target video.

In an optional implementation, the hot topic panel entrance is provided with an entrance for filming a video in the same style or an entrance for submitting a video.

In an optional implementation, the first collection of videos belongs to a hot topic video stream, and the method further comprises:

hiding a play progress bar of the target video on the play page of the target video.

In a second aspect, the present disclosure provides a video processing apparatus, the apparatus comprising:

a first display module for displaying, on a play page of a target video, a hot topic panel entrance: wherein the target video belongs to a first collection of videos;

a second display module for in response to a trigger operation for the hot topic panel entrance, displaying a hot topic panel on a play page of the target video, wherein a hot topic content for the first collection of videos is displayed on the hot topic panel.

In a third aspect, the present disclosure provides a computer-readable storage medium stored with instructions therein, the instructions, when running on a terminal device, causing the terminal device to implement the above method.

In a fourth aspect, the present disclosure provides a device, comprising: a memory, a processor and a computer program stored on the memory and executable on the processor, wherein the processor, when executing the computer program, implements the above method.

In a fifth aspect, the present disclosure provides a program product comprising a computer program/instruction, the computer program/instruction, when executed, implementing the above method.

In comparison to the prior art, the technical solution provided by the embodiments of the present disclosure at least has following advantages:

In the video processing method provided by the embodiments of the present disclosure, first of all, a hot topic panel entrance is displayed on a play page of a target video, wherein the target video belongs to a first collection of videos. Then, in response to a trigger operation for the hot topic panel entrance, a hot topic panel is displayed on a play page of the target video, wherein a hot topic content for the first collection of videos is displayed on the hot topic panel. The embodiments of the present disclosure may jump to the hot topic panel displayed with a hot topic content from the play page of the target video. Therefore, a user may browse hot topic contents related to the video while watching the video. As a result, more approaches are provided for processing the videos, the diversified needs of the users for video processing are met and the video viewing experience of the users is enhanced.

BRIEF DESCRIPTION OF THE DRAWINGS

The drawings here are incorporated into the description as a part of it, illustrate the embodiments compliant with the present disclosure, and are combined with the description to explain the principles of the present disclosure.

To more clearly explain the technical solution in the embodiments of the present disclosure or in the prior art, the drawings needed in the description of the embodiments or the prior art are to be introduced simply below. Apparently, those skilled in the art may further obtain other drawings from these illustrated without any exercises of inventive work.

DETAILED DESCRIPTION OF EMBODIMENTS

For a clearer understanding of the above objectives, features and advantages of the present disclosure, the solution of the present disclosure is to be further described below. It is to be appreciated that embodiments of the present disclosure and features within the embodiments may be combined with one another without causing conflicts.

Many details are elaborated in the following description to provide a more comprehensive understanding of the present disclosure. However, the present disclosure may be further implemented in different ways than those described here. Apparently, the embodiments disclosed in the description is only a part of the embodiments of the present disclosure, rather than all of them.

To process videos in a more diversified way, the present disclosure provides a video processing method. Specifically, the method comprises displaying, on a play page of a target video, a hot topic panel entrance: upon receiving a trigger operation for the hot topic panel entrance, displaying a hot topic panel on a play page of the target video, wherein a hot topic content for the first collection of videos to which the target video belongs is displayed on the hot topic panel.

Accordingly, by providing the hot topic panel entrance on the play page of the video, embodiments of the present disclosure implement the function of jumping to the hot topic panel displayed with hot topic contents from the play page of the target video. Therefore, a user may browse hot topic contents related to the video while watching it. As a result, more approaches are provided for processing the videos, the diversified needs of the users for video processing are met and the video viewing experience of the users is enhanced.

Figure 1:
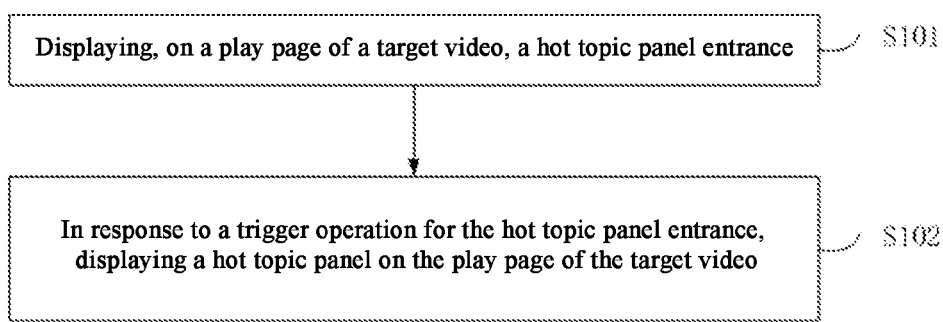
FIG. 1 illustrates a flowchart of a video processing method provided by embodiments of the present disclosure.

On this basis, embodiments of the present disclosure provide a method for video processing. FIG. 1 illustrates a flowchart of a method for video processing provided by embodiments of the present disclosure. The method comprises:

S101: displaying, on a play page of a target video, a hot topic panel entrance.

Wherein the target video belongs to a first collection of videos.

In the embodiments of the present disclosure, the target video may be any video in the first collection of videos. The first collection of videos may include multiple videos or only one video, i.e., the target video.

In an optional implementation, videos included in the first collection of videos may be of the same subject matter. For example, the first collection of videos includes hot videos about a certain hot event.

In the embodiments of the present disclosure, a hot topic panel entrance is provided on the play page of the target video, where the hot topic panel entrance is provided for entering the hot topic panel. During the playing of the target video, the hot topic panel entrance is displayed on the play page of the target video, such that the user may enter the hot topic panel by triggering the hot topic panel entrance.

Figure 2:
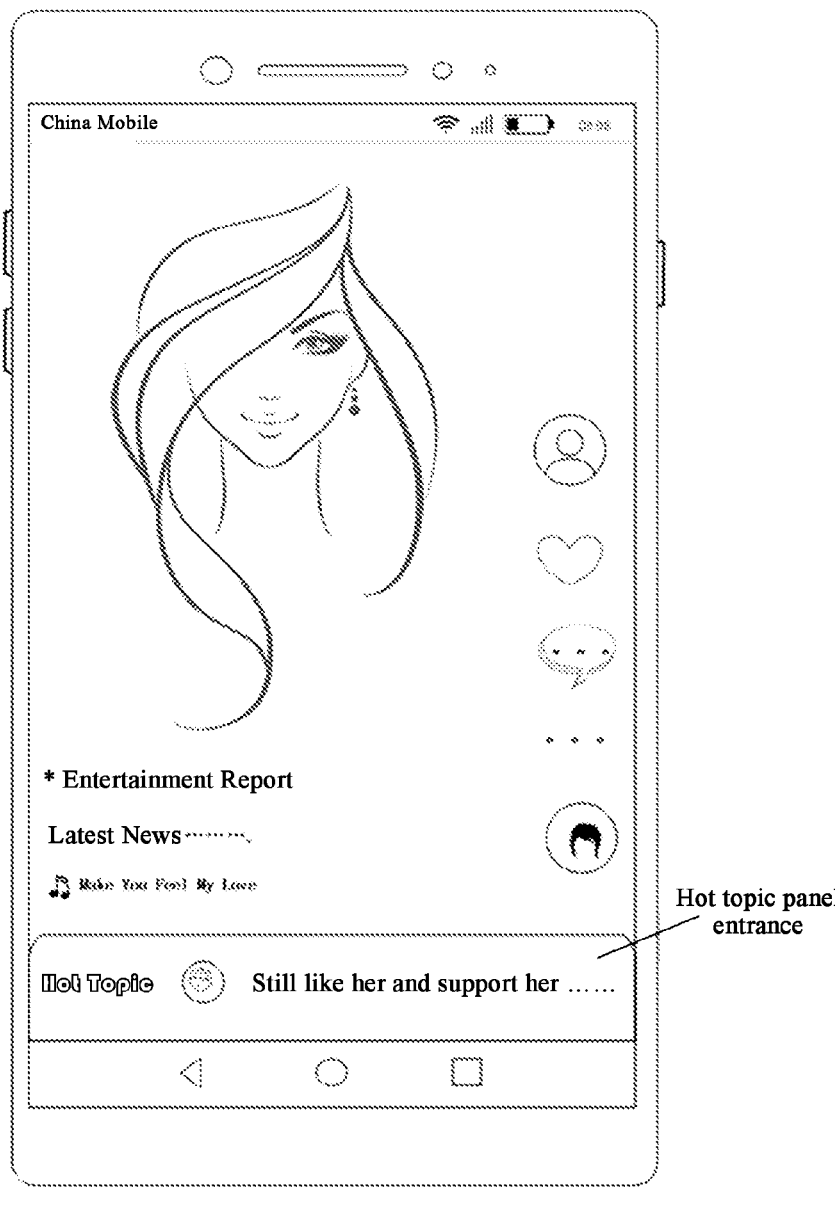
FIG. 2 illustrates a schematic diagram of display of a hot topic panel entrance provided by the embodiments of the present disclosure.

In an optional implementation, the hot topic panel entrance may be displayed at the bottom of the play page of the target video. FIG. 2 illustrates a schematic diagram of display of a hot topic panel entrance provided by the embodiments of the present disclosure, wherein the display form of the hot topic panel entrance is not limited. For example, the hot topic panel entrance may be displayed in the form of a semi-transparent bottom panel as demonstrated in FIG. 2.

To enable the user to know the hot topic comments on the contents within the first collection of videos to which the target video belongs in advance and attract more users to access the hot topic panel and participate in discussions, embodiments of the present disclosure may further display, within a display area corresponding to the hot topic panel entrance, hot topic comments for the first collection of videos. As illustrated in FIG. 2, the content of "still like her and support her . . . " displayed within the display area corresponding to the hot topic panel entrance is considered as the hot topic comments on the first collection of videos.

In an optional implementation, the multiple hot topic comments for the first collection of videos are displayed in a manner of rolling carousel within the display area corresponding to the hot topic panel entrance.

In addition, while the hot topic comments are being displayed, information (such as profile photo and the like) of the users that post the hot topic comments may be further displayed.

To indicate the user the position of the hot topic panel entrance, embodiments of the present disclosure may further display a hot topic identification within the display area corresponding to the hot topic panel entrance, e.g., characters of "Hot Topic" with effects illustrated by FIG. 2.

Furthermore, to provide more methods for processing videos, embodiments of the present disclosure may further provide an entrance for filming a short video in the same style or submitting a short video on the hot topic panel entrance. The user may trigger the operation of filming a short video in the same style on the target video directly on the current page via the entrance for filming a short video in the same style without looking for it. The user experience is accordingly improved. Besides, the user may further perform the submitting video function regarding the subject matter of the first collection of videos to which the target video belongs directly on the current page via the entrance for the submitting video function without looking for it. The user experience is further enhanced. For example, if the subject matter of the first collection of videos is a particular hot event, the user may submit a short video about the hot event via the entrance for the submitting video function provided on the hot topic panel. Therefore, it is easy for the user to operate.

In practical applications, the videos belonging to the same collection of videos correspond to the same hot topic comments. Thus, when the videos belonging to the same collection of videos are switched to play; the switching of the hot topic comments within the display area corresponding to the hot topic panel entrance may not be triggered. In other words, the videos in the same collection of videos correspond to the same hot topic comments.

In an optional implementation, the first collection of videos may belong to a hot video stream, i.e., the videos in the first collection of videos all belong to hot videos, i.e., the target video belongs to the hot videos. As the hot videos are characterized by short length, the user are less likely to adjust the play progress bar while watching the hot videos. The play progress bar of the target video is hidden on its play page in the embodiments of the present disclosure to guarantee the overall display effects of the video play page provided with the hot topic panel entrance while the user can still watch the hot topic videos.

Besides, the voice control bar and the like on the play page of the target video may also be hidden according to the display requirements in the embodiments of the present disclosure. Embodiments of the present disclosure are not restricted in this regard.

S102: in response to a trigger operation for the hot topic panel entrance, a hot topic panel is displayed on a play page of the target video.

Wherein a hot topic content for the first collection of videos is displayed on the hot topic panel.

In the embodiments of the present disclosure, when a trigger operation by the user for the hot topic panel entrance is received, the hot topic panel may be displayed on the play page of the target video and the hot topic contents for the first collection of videos to which the target video belongs are simultaneously displayed on the hot topic panel, wherein the trigger operations for the hot topic entrance may include clicking, swiping up and other operations.

In an optional implementation, the hot topic panel entrance on the play page of the target video may be a partial area of the hot topic panel. Specifically, when a drag and swipe-up operation on the hot topic panel entrance is received, the hot topic panel is pulled up from the bottom for display on the play page of the target video. The user experience can be enhanced on the basis of the dynamic display effects of the above hot topic panel.

Figure 3:
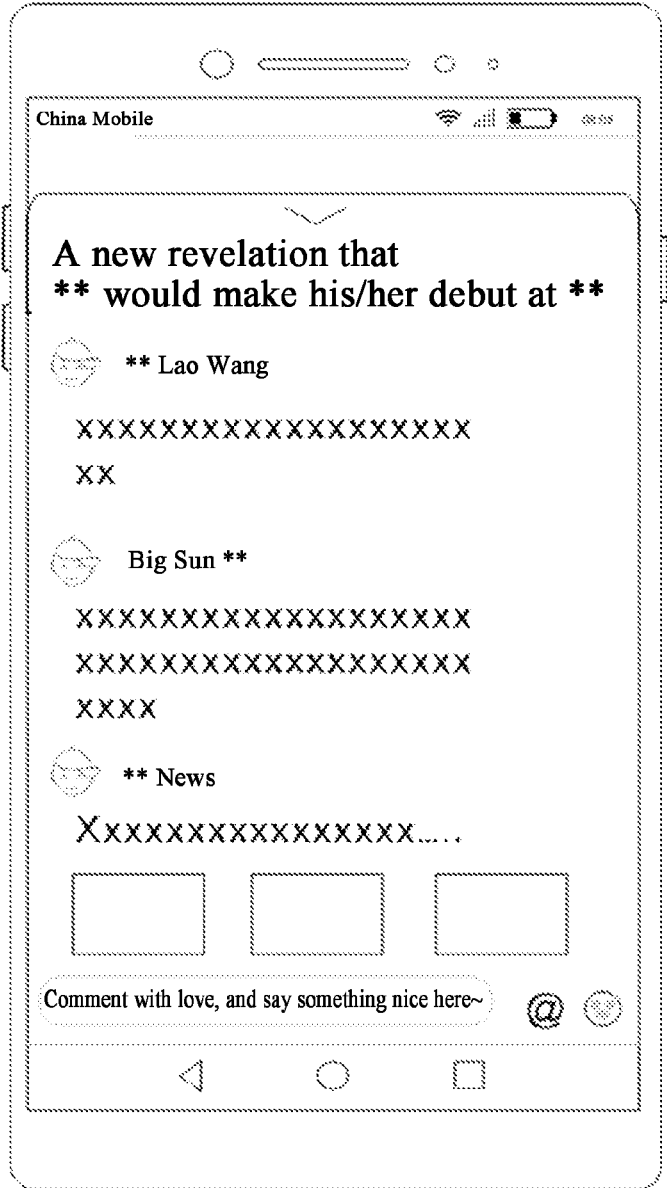
FIG. 3 illustrates a schematic diagram of a hot topic panel provided by the embodiments of the present disclosure.

In the embodiments of the present disclosure, the hot topic contents for the first collection of videos may include hot topic comments and/or hot topic articles for the first collection of videos, wherein the hot topic articles may include pictures and/or texts. FIG. 3 illustrates a schematic diagram of a hot topic panel provided by the embodiments of the present disclosure, wherein the hot topic comments and the hot topic articles for the first collection of videos are displayed on the hot topic panel. The hot topic comments and the hot topic articles may be displayed in a mixed arrangement.

In an optional implementation, the hot topic panel may be closed by clicking a cross mark, swiping down and the like, to trigger the continue playing of the target video. As such, the display of the hot topic panel would not affect the user to watch the first collection of videos in the embodiments of the present disclosure. The user experience is accordingly improved.

It is noteworthy that the hot topic comments and the hot topic articles displayed on the hot topic panel are those sent to the terminal for display by the server after filtering the comments and the related articles of respective videos in the first collection of videos. For example, there may be massive comments on each video in the video collection about a particular hot topic event and numerous articles about the same hot topic event. In such case, the server may only send the comments and articles with a relatively high number of likes, as the hot topic comments and the hot topic articles, to the client, to facilitate the display by the client on the hot topic panel of the video collection.

In an optional implementation, to provide more interaction options on the hot topic panel, the user may like and reply the hot topic comments and the hot topic articles displayed on the hot topic panel.

In addition, the user may swipe the hot topic panel up and down to display more hot topic comments and hot topic articles for the first collection of videos.

To further diversify the interactions of the hot topic panel, a comment entrance may be further provided on the hot topic panel. Therefore, the current user may post a comment on the subject matter of the first collection of videos through the comment entrance. Specifically, the user may bring up a comment keyboard by clicking the comment entrance below the hot topic panel and further post a comment through the comment key board.

In practical applications, after the comment content for the first collection of videos by the current user is received based on the comment entrance on the hot topic panel, the comment content is displayed at the top of the hot topic panel. The experience of the user in posting a comment is thus improved.

In the video processing method provided by the embodiments of the present disclosure, first of all, a hot topic panel entrance is displayed on a play page of a target video; wherein the target video belongs to a first collection of videos. Then, in response to a trigger operation for the hot topic panel entrance, a hot topic panel is displayed on a play page of the target video, wherein a hot topic content for the first collection of videos is displayed on the hot topic panel. By providing the hot topic panel entrance on the video play page, embodiments of the present disclosure implement the function of jumping to the hot topic panel displayed with hot topic contents from the play page of the target video. Therefore, the user may browse hot topic contents related to the video while watching the video. As a result, more approaches are provided for processing the videos, the diversified needs of the users for video processing are met and the viewing experience of the users is enhanced.

In an application scenario, the user may switch from one video collection to another video collection while watching the videos. Since different video collections correspond to different hot topic contents, the hot topic comments within the display area corresponding to the hot topic panel entrance on the video play page may be switched during the switchover of the video collections.

To be specific, upon receiving a trigger operation of switching from the first collection of videos to a second collection of videos, the embodiments of the present disclosure switch the hot topic comments displayed within the display area corresponding to the hot topic panel entrance to the hot topic comments on the second collection of videos.

Furthermore, to indicate the user of the current switching of the video collections, the embodiments of the present disclosure may hide the hot topic panel entrance downward in response to the first collection of videos is switched out, and float the hot topic panel upward in response to the second collection of videos is switched in upon receiving a trigger operation of switching from the first collection of videos to a second collection of videos; and display, within the display area corresponding to the hot topic panel entrance, the hot topic comments for the second collection of videos. In the embodiments of the present disclosure, the dynamic effects of first hiding the above hot topic panel entrance downward and then floating it up indicate the user of the current switching of the video collections, therefore attract the attention of the user to the hot topic comments on the second video collection displayed within the display area corresponding to the hot topic panel entrance and further encourage the user to trigger the display of the hot topic panel.

In practical applications, because the discussions on the hot topic videos are intensive, the video processing method provided by the embodiments of the present disclosure is particularly suitable for processing the hot topic videos. Specifically, after the user enters the hot topic video stream, when a certain video collection in the hot topic video stream is being played, the hot topic panel entrance may be displayed on the play page for each hot topic video in the video collection. In response to receiving a trigger operation for the hot topic panel entrance, the hot topic panel is displayed on the play page and the corresponding hot topic comments and/or hot topic articles of the video collection are displayed on the hot topic panel. Hence, the user may browse the hot topic comments and/or hot topic articles while watching the hot topic videos and gain a better experience in watching hot topic videos.

Figure 4:
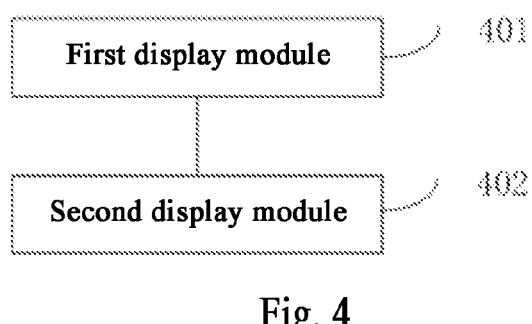
FIG. 4 illustrates a structural diagram of a video processing apparatus provided by the embodiments of the present disclosure.

On the basis of the same inventive concept of the above method embodiments, the present disclosure further provides a video processing apparatus. FIG. 4 illustrates a structural diagram of a video processing apparatus provided by the embodiments of the present disclosure. The apparatus comprises:

a first display module 401 for displaying, on a play page of a target video, a hot topic panel entrance: wherein the target video belongs to a first collection of videos;

a second display module 402 for in response to a trigger operation for the hot topic panel entrance, displaying a hot topic panel on a play page of the target video, wherein the hot topic content for the first collection of videos is displayed on the hot topic panel.

In an optional implementation, the hot topic contents for the first collection of videos include hot topic comments and/or hot topic articles for the first collection of videos.

In an optional implementation, the apparatus further comprises:

a third display module for displaying hot topic comments on the first collection of videos within a display area corresponding to the hot topic panel entrance.

In an optional implementation, the third display module is specifically provided for:

displaying, within a display area corresponding to the hot topic panel entrance, a plurality of hot topic comments for the first collection of videos in a manner of rolling carousel.

In an optional implementation, the apparatus further comprises:

a first switching module for switching hot topic comments displayed within the display area corresponding to the hot topic panel entrance to hot topic comments for the second collection of videos in response to a trigger operation of switching from the first collection of videos to a second collection of videos.

In an optional implementation, the apparatus further comprises:

a second switching module for hiding the hot topic panel entrance downward in response to the first collection of videos is switched out and floating the hot topic panel entrance upward in response to the second collection of videos is switched in upon receiving a trigger operation of switching from the first collection of videos to a second collection of videos: and displaying, within the display area corresponding to the hot topic panel entrance, hot topic comments for the second collection of videos.

In an optional implementation, the hot topic panel is provided with a comment entrance, and the apparatus further comprises:

a receiving module for receiving a comment content posted by a current user against the first collection of videos based on the comment entrance: and a fourth display module for displaying on the hot topic panel the comment content at top.

In an optional implementation, the hot topic panel entrance is a partial area of the hot topic panel. The second display module is specifically provided for:

in response to a drag and swipe-up operation on the hot topic panel entrance, pulling the hot topic panel from bottom for display on the play page of the target video.

In an optional implementation, the hot topic panel entrance is provided with an entrance for filming a video in the same style or an entrance for submitting a video.

In an optional implementation, the first collection of videos belongs to a hot topic video stream, and the apparatus further comprises:

a hiding module for hiding a play progress bar of the target video on the play page of the target video.

In the video processing apparatus provided by the embodiments of the present disclosure, first of all, a hot topic panel entrance is displayed on a play page of a target video; wherein the target video belongs to a first collection of videos. Then, in response to a trigger operation for the hot topic panel entrance, a hot topic panel is displayed on a play page of the target video, wherein a hot topic content for the first collection of videos is displayed on the hot topic panel. By providing the hot topic panel entrance on the video play page, embodiments of the present disclosure implement the function of jumping to the hot topic panel displayed with hot topic contents from the play page of the target video. Therefore, the user may browse hot topic contents related to the video while watching the video. As a result, more approaches are provided for processing the videos, the diversified needs of the users for video processing are met and the viewing experience of the users is enhanced.

In addition to the above method and apparatus, the embodiments of the present disclosure further provide a computer-readable storage medium stored thereon with instructions, the instructions, when running on a terminal device, causing the terminal device to implement the video processing method according to the embodiments of the present disclosure.

Embodiments of the present disclosure further provide a computer program product comprising a computer program/instruction, the computer program/instruction, when executed by a processor, implementing the video processing method according to the embodiments of the present disclosure.

Figure 5:
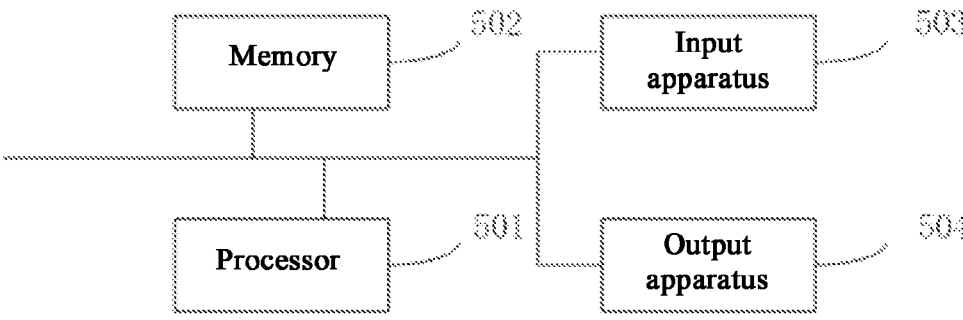
FIG. 5 illustrates a structural diagram of a video processing device provided by the embodiments of the present disclosure.

Moreover, embodiments of the present disclosure further provide a video processing device. According to FIG. 5, the device comprises:

a processor 501, a memory 502, an input unit 503 and an output unit 504. The video processing device may include one or more processors 501 and FIG. 5 only shows one processor as the example. In some embodiments of the present disclosure, the processor 501, the memory 502, the input unit 503 and the output unit 504 may be connected by buses or other components. FIG. 5 illustrates the bus connection as an example.

The memory 502 may be used for storing software programs and modules and the processor 501 operates the software programs and modules stored in the memory 502 to execute the various functional applications and data processing of the video processing device. The memory 502 mainly include program storage area and data storage area, wherein the program storage area may store operating systems and applications desired by at least one function and the like. Besides, the memory 502 may include a high random access memory and further a non-volatile memory, such as at least one magnetic disk storage device, flash device or other volatile solid-state storage devices. The input unit 503 may be provided for receiving input digital or character information and generating signal inputs associated with the user setting and the functional control of the video processing device.

Specifically, in the embodiments, the processor 501 would load into the memory 502 executable files corresponding to the progress of one or more applications in accordance with the following instructions. The processor 501 further operates the applications stored in the memory 502 to implement the above various functions of the video processing device.

It is to be explained that relational terms such as "first" and "second" in the text are disclosed only to distinguish one entity or operation from a further entity or operation without requiring or suggesting any actual relations or sequences between these entities or operations. Besides, the terms "comprise", "contain" or any other variants are not featured with exclusiveness. Accordingly, the procedure, method, object or device including a series of factors may further include other factors not clearly listed in addition to those stated. Alternatively, inherent factors of the procedure, method, object or device are further included. The procedure, method or device including factors defined by the expression of "comprising one . . . " may further contain other same factors if no more restrictions are provided.

The above is just the specific implementations of the present disclosure, which are provided for those skilled in the art to understand or implement the present disclosure. Many modifications to the embodiments are obvious for those skilled in the art. General principles defined in the text may be implemented in other embodiments without deviating from the spirit or scope of the present disclosure. Therefore, the present disclosure will not be restricted to the embodiments disclosed herein and instead has a broadest scope consistent with the principles and novel features disclosed here.

We claim:

1. A method for video processing, comprising:

displaying, on a play page of a target video, a hot topic panel entrance, wherein the target video belongs to a first collection of videos, and the first video collection comprises videos with a same subject content;

displaying, within a display area corresponding to the hot topic panel entrance, a hot topic comment for the first collection of videos, wherein videos in the first collection of videos correspond to a same hot topic comment; and in response to a trigger operation for the hot topic panel entrance, displaying a hot topic panel on the play page of the target video, wherein a hot topic content for the first collection of videos is displayed on the hot topic panel, the hot topic content comprises at least a hot topic article for the first collection of videos, and the hot topic panel comprises a comment entrance configured to receive a user comment on a subject matter of the first collection of videos;

upon receiving a trigger operation of switching from the first collection of videos to a second collection of videos, hiding the hot topic panel entrance downward in response to the first collection of videos being switched out, and floating the hot topic panel entrance upward in response to the second collection of videos is switched in; and displaying a hot topic comment for the second collection of videos within the display area corresponding to the hot topic panel entrance.

2. The method of claim 1, wherein the displaying, within a display area corresponding to the hot topic panel entrance, a hot topic comment for the first collection of videos comprises:

displaying, within the display area corresponding to the hot topic panel entrance, a plurality of hot topic comments for the first collection of videos in a rolling manner.

3. The method of claim 1, wherein the method further comprises:

in response to a trigger operation of switching from the first collection of videos to a second collection of videos, switching the hot topic comment displayed within the display area corresponding to the hot topic panel entrance to a hot topic comment for the second collection of videos.

4. The method of claim 1, further comprising:

displaying the user comment at a top portion of the hot topic panel.

5. The method of claim 1, wherein the hot topic panel entrance is a partial area of the hot topic panel, and wherein the in response to a trigger operation for the hot topic panel entrance, displaying a hot topic panel on a play page of the target video comprises:

in response to a drag and swipe-up operation on the hot topic panel entrance, pulling the hot topic panel from a bottom portion of the play page for display on the play page of the target video.

6. The method of claim 1, wherein the hot topic panel entrance includes an entrance for filming a video in a style or an entrance for submitting a video.

7. The method of claim 1, wherein the first collection of videos include a hot topic video stream, and the method further comprises:

hiding a play progress bar of the target video on the play page of the target video.

8. A device for video processing, comprising:

one or more memories storing instructions thereon; and one or more processors configured to execute the instructions and perform operations comprising:

displaying, on a play page of a target video, a hot topic panel entrance, wherein the target video belongs to a first collection of videos, and the first video collection comprises videos with a same subject content;

displaying, within a display area corresponding to the hot topic panel entrance, a hot topic comment for the first collection of videos, wherein videos in the first collection of videos correspond to a same hot topic comment; and in response to a trigger operation for the hot topic panel entrance, displaying a hot topic panel on the play page of the target video, wherein a hot topic content for the first collection of videos is displayed on the hot topic panel, the hot topic content comprises at least a hot topic article for the first collection of videos, and the hot topic panel comprises a comment entrance configured to receive a user comment on a subject matter of the first collection of videos;

upon receiving a trigger operation of switching from the first collection of videos to a second collection of videos, hiding the hot topic panel entrance downward in response to the first collection of videos being switched out, and floating the hot topic panel entrance upward in response to the second collection of videos is switched in; and displaying a hot topic comment for the second collection of videos within the display area corresponding to the hot topic panel entrance.

9. The device of claim 8, wherein the displaying, within a display area corresponding to the hot topic panel entrance, a hot topic comment for the first collection of videos comprises:

displaying, within the display area corresponding to the hot topic panel entrance, a plurality of hot topic comments for the first collection of videos in a rolling manner.

10. The device of claim 8, wherein the operations further comprise:

in response to a trigger operation of switching from the first collection of videos to a second collection of videos, switching the hot topic comment displayed within the display area corresponding to the hot topic panel entrance to a hot topic comment for the second collection of videos.

11. The device of claim 8, wherein the operations further comprise:

displaying the user comment at a top portion of the hot topic panel.

12. The device of claim 8, wherein the hot topic panel entrance is a partial area of the hot topic panel, and wherein the in response to a trigger operation for the hot topic panel entrance, displaying a hot topic panel on a play page of the target video comprises:

in response to a drag and swipe-up operation on the hot topic panel entrance, pulling the hot topic panel from a bottom portion of the play page for display on the play page of the target video.

13. A non-transitory computer-readable storage medium stored with instructions therein, the instructions, when executed by one or more processors, causing the one or more processors to perform operations comprising:

displaying, on a play page of a target video, a hot topic panel entrance, wherein the target video belongs to a first collection of videos, and the first video collection comprises videos with a same subject content;

displaying, within a display area corresponding to the hot topic panel entrance, a hot topic comment for the first collection of videos, wherein videos in the first collection of videos correspond to a same hot topic comment; and in response to a trigger operation for the hot topic panel entrance, displaying a hot topic panel on the play page of the target video, wherein a hot topic content for the first collection of videos is displayed on the hot topic panel, the hot topic content comprises at least a hot topic article for the first collection of videos, and the hot topic panel comprises a comment entrance configured to receive a user comment on a subject matter of the first collection of videos;

upon receiving a trigger operation of switching from the first collection of videos to a second collection of videos, hiding the hot topic panel entrance downward in response to the first collection of videos being switched out, and floating the hot topic panel entrance upward in response to the second collection of videos is switched in; and displaying a hot topic comment for the second collection of videos within the display area corresponding to the hot topic panel entrance.

14. The non-transitory computer-readable storage medium of claim 13, wherein the displaying, within a display area corresponding to the hot topic panel entrance, a hot topic comment for the first collection of videos comprises:

displaying, within the display area corresponding to the hot topic panel entrance, a plurality of hot topic comments for the first collection of videos in a rolling manner.

15. The non-transitory computer-readable storage medium of claim 13, wherein the operations further comprise:

in response to a trigger operation of switching from the first collection of videos to a second collection of videos, switching the hot topic comment displayed within the display area corresponding to the hot topic panel entrance to a hot topic comment for the second collection of videos.

* * * * *